United States Patent [19]

Roseliep

[11] Patent Number: 4,686,864
[45] Date of Patent: Aug. 18, 1987

[54] FLYWHEEL STARTER GEAR AND METHOD OF MAKING

[76] Inventor: Robert E. Roseliep, 6 Elmsleigh La., Grosse Pointe, Mich. 48230

[21] Appl. No.: 824,377

[22] Filed: Jan. 31, 1986

[51] Int. Cl.⁴ .................. F16H 55/00; B21D 53/28
[52] U.S. Cl. ................................ 74/431; 74/446;
        403/270; 228/113; 29/159.2
[58] Field of Search .............. 74/431, 439, 446, 448,
        74/449, 447, 434, 460; 403/282, 270, 271;
        29/159.2, 159 R; 228/112, 113

[56] References Cited

U.S. PATENT DOCUMENTS

| | | | |
|---|---|---|---|
| 1,338,672 | 5/1920 | Calkins | 74/446 |
| 2,756,607 | 7/1956 | Mochel et al. | 74/439 |
| 3,618,196 | 11/1971 | Sluetz | 228/113 |
| 3,631,585 | 1/1972 | Stamm | 403/270 |
| 3,831,459 | 8/1974 | Satzler et al. | 74/439 |
| 3,982,415 | 9/1976 | Killop | 74/431 |
| 4,031,769 | 6/1977 | Kassing | 74/448 |
| 4,070,920 | 1/1978 | Le Blanc | 74/446 |
| 4,128,018 | 12/1978 | Muntean | 74/447 |
| 4,211,589 | 7/1980 | Fisher et al. | 403/270 |

Primary Examiner—Cornelius J. Husar
Assistant Examiner—Peter M. Cuomo
Attorney, Agent, or Firm—Barnes, Kisselle, Raisch, Choate, Whittemore & Hulbert

[57] ABSTRACT

A flywheel starter gear construction which includes a strip of gear stock surrounding a flywheel disc and friction welded to the disc in an annular weld area, the gear teeth on the gear stock being formed by moving the assembly through a pot broach, and the method of forming the flywheel starter gear by selecting a measured length of gear stock, forming it into a circle and friction welding the circular gear stock to the periphery of a flywheel disc, then moving the welded parts through a pot broach to form the gear teeth to serve as a starter gear.

3 Claims, 5 Drawing Figures

U.S. Patent    Aug. 18, 1987    4,686,864
FIG.1
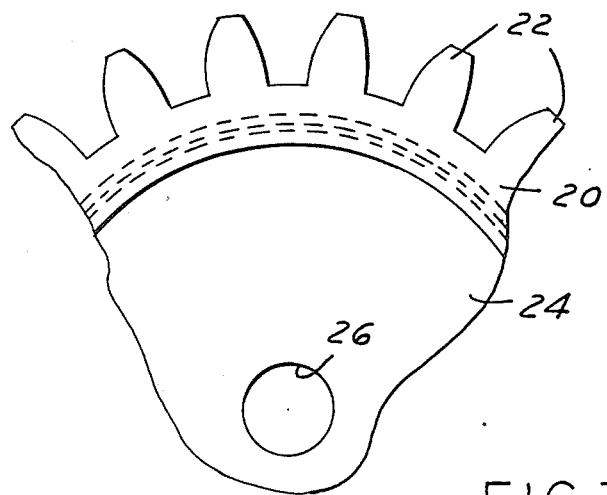
FIG.2    FIG.3    FIG.4
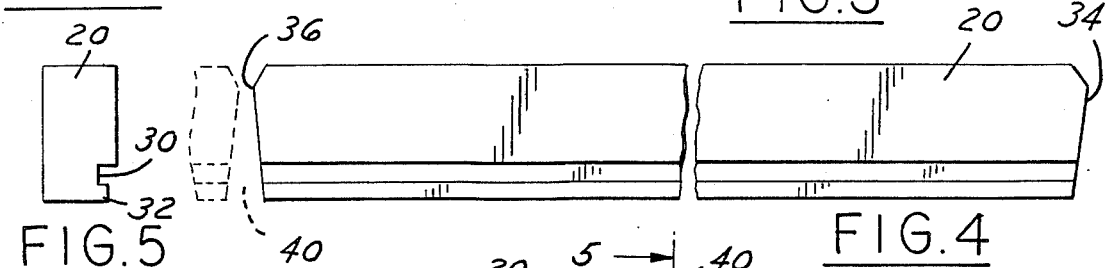
FIG.5
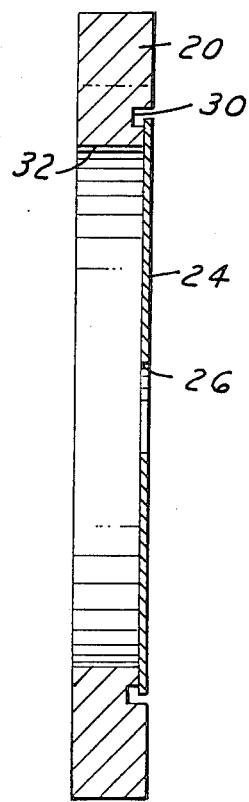
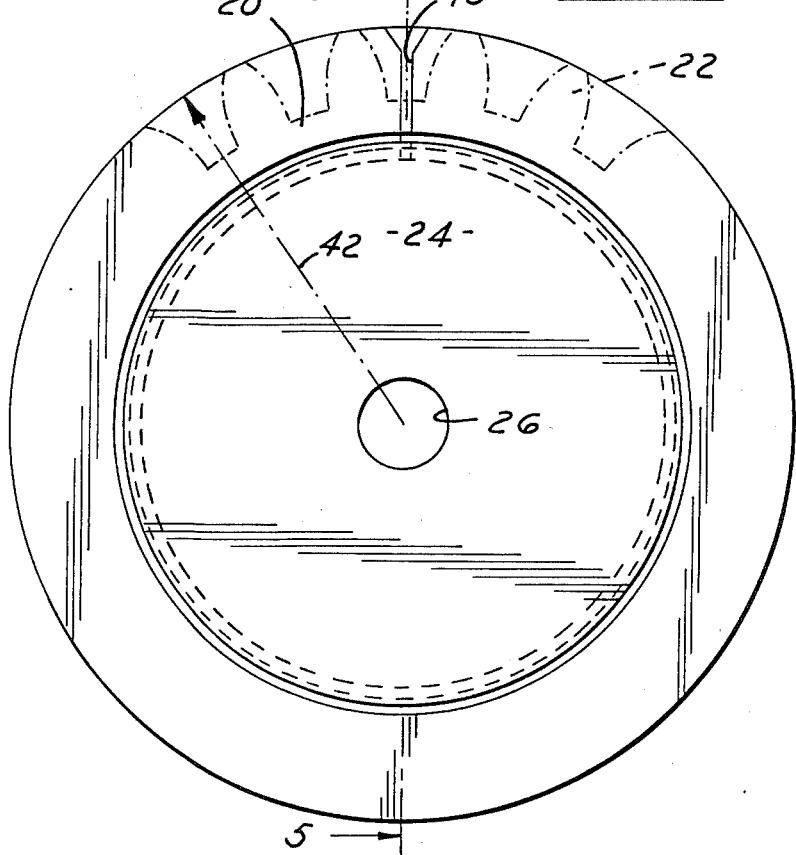

FLYWHEEL STARTER GEAR AND METHOD OF MAKING

FIELD OF INVENTION

Flywheel starter gears for automotive and other combustion engines and method of making the same.

BACKGROUND AND FEATURES OF THE INVENTION

At the present time, flywheel starter gears, which are of relatively large diameter, are made by starting with a strip of high carbon steel, having a square or rectangular cross-section, and cutting it to a preset length. The strip is then rolled into a hoop configuration with a major diameter larger than the finished gear size, and the ends are welded together to close the loop. The part is then annealed, coined flat and either coined to size on the minor diameter or bored to size or both. The closed hoops are then loaded onto an expanding type arbor in quantities of twenty-five or so and the gear teeth and major diameter are cut using a hobbing machine or gear shaping machine.

After gear cutting, the closed ring is then placed in a fixture, formed round, and centered and then weld mounted on a flat or flanged stamped center plate.

The above-described conventional design presents problems in that the gear rings sometime move on the arbor during the gear cutting resulting in poor tooth quality and excessive pitch line runout. The end welds of the loop are difficult to machine and weld separation due to excessive centrifugal force sometimes occurs.

It is an object and feature of the present invention to provide a superior ring gear assembly which is stronger than the previous designs with more accurate gear tooth dimensions and which is not subject to weld failures. The overall cost is less because of the elimination of the ring butt weld and annealing, and the sizing of the minor and major diameters.

A further object is the method or process of forming the improved ring gear by a combination of extruded or roll form stock, a friction welding of gear ring stock to a center plate and a pot broaching of the gear teeth as will be described in detail below.

Other objects and features of the invention are to be found in the following description and claims in which the principles of the invention are described and details of the product and the method of forming are set forth to enable persons skilled in the art to utilize the invention, all in connection with the best mode presently contemplated for the invention.

BRIEF DESCRIPTION OF THE DRAWINGS

DRAWINGS accompany the disclosure and the various views thereof may be briefly described as:

FIG. 1, a segmental view of a completed flywheel ring gear.

FIG. 2, an end view of a gear ring section.

FIG. 3, an elevation of a ring gear strip.

FIG. 4, an elevation of a completed ring gear and central support plate.

FIG. 5, a sectional view on lie 5—5 of FIG. 4.

DETAILED DESCRIPTION OF THE INVENTION AND THE MANNER AND PROCESS OF USING IT

With reference to the drawings, in FIG. 1, a segmental view of a completed flywheel ring gear is illustrated showing an outer ring gear portion 20 having teeth 22 and a flywheel center plate 24 with a mounting hole 26. A strip of gear tooth ring stock is illustrated in FIGS. 2 and 3. An end view in FIG. 2 shows a rectangular cross-section of the ring gear stock 20 with a longitudinal slot 30 above a narrowed protruding portion 32 having a width slightly less than the overall width of the gear stock.

The gear stock 20 is extruded or roll formed of a suitable steel which can be subsequently induction hardened. The groove 30 provides a surface on the portion 32 for friction welding of the flywheel plate as will be described. In some instances, the groove 30 may not be required depending on the flywheel construction. It is preferable that the ring stock be trimmed to a reasonably accurate length, and, as shown in FIG. 3, to have the ends 34, 36 shaped so that when the ends of the stock are brought together in a ring, as shown by the dotted section at the left of FIG. 3, a tooth timing gap is formed at 40.

The ring stock 20 is formed in a die or fixture to conform to the shape shown in FIG. 4 which is the weld assembly view. The part-finished major diameter, shown by the arrow 42 in FIG. 4, is maintained by the fixture (not shown) and the center plate stamping 24 is positioned from its center hole 26.

This entire assembly is placed into a friction welding machine which will clamp one member, either the ring 20 or the plate 24, and drive the other member in rotation at a proper speed to achieve the friction weld while exerting the proper axial pressure between the members so as to create a friction weld. The friction will develop heat on the narrow surface of the portion 32 below groove 30 to achieve the weld.

The welded assembly 20, 24 is now placed in a pot broaching machine which will locate the assembly from the major diameter and circumferentially from the tooth-timing gap 40.

This will locate the residual gap 40 in a nonfunctional area of the minor diameter of an ultimate tooth space as shown in FIG. 4. The assembly is moved axially through the pot broach to form the proper major tooth diameter as well as the teeth 22.

After broaching, the toothed assembly is induction hardened and balanced to complete the part for production assembly.

The resulting ring gear flywheel has accurate gear teeth since the broaching process cuts each part individually while locating from the major diameter. The described process eliminates butt welding and annealing and internal diameter sizing as required on the existing methods and can result in a lighter part with a lower overall cost.

What is claimed is:

1. A flywheel starter gear which comprises a circular strip of steel having a rectangular cross-section with an outer peripheral diameter and an inner diameter, a plurality of spaced teeth formed on the outer peripheral diameter, and a center support disc having an annular surface friction welded to an annular radial surface adjacent the inner diameter of said strip, said annular radial surface of said strip has an annular groove spaced radially outwardly of the inner diameter of said circular strip forming an annular ridge on said surface, said disc having an outer diameter and a surface adjacent said outer diameter overlying said annular ridge.

2. A method of forming a flywheel starter gear which comprises:
 (a) preparing a gear tooth strip of predetermined length of steel stock having opposite ends and a first surface to be friction welded to a support disc,
 (b) forming said strip into a circular loop having an outer peripheral diameter and an inner diameter,
 (c) forming a center support disc with a central support hole, a peripheral edge, and a flat, annular, radial second surface adjacent the peripheral edge to be friction welded to said strip,
 (d) friction welding said first and second surfaces to provide a unitized assembly about a first axis, and
 (e) moving said assembly in the direction of said first axis through a pot broach while in a plane normal to said first axis to form teeth in the outer peripheral diameter of said strip
 (f) forming a groove adjacent one edge of said strip to provide an annular ridge adjacent the inner diameter of said strip when formed into a circular loop, and positioning said center support disc such that a portion of a surface adjacent the periphery of the disc overlies said ridge prior to friction welding of said strip and said disc.

3. A method as defined in claim 2 in which said circular loop is formed with a radial gap between the ends to serve as a timing gap for gear formation, and orienting said assembly circumferentially with said radial gap prior to moving said assembly through said pot broach.

* * * * *